United States Patent [19]

Mahrer

[11] 4,084,611

[45] Apr. 18, 1978

[54] SINGLE-HANDLE MIXING VALVE

[76] Inventor: Francois-Régis Mahrer, Avenue Dumas 14, 1206 Geneva, Switzerland

[21] Appl. No.: 628,804

[22] Filed: Nov. 4, 1975

[30] Foreign Application Priority Data

Nov. 4, 1974 Switzerland .................. 14725/74
May 1, 1975 Switzerland .................... 5610/75

[51] Int. Cl.² ............................................. F16K 11/18
[52] U.S. Cl. ........................... 137/454.2; 137/329.3; 137/636.1; 137/636.2
[58] Field of Search ............ 137/454.2, 454.6, 636, 137/636.1, 636.2, 636.3, 636.4, 329.4, 454.5, 359, 625.17

[56] References Cited

U.S. PATENT DOCUMENTS

| 618,227 | 1/1899 | Hawes | 137/636.1 |
| 1,095,003 | 4/1914 | Leonard | 137/636.2 |
| 3,420,272 | 1/1969 | Corlett | 137/636.3 |
| 3,437,112 | 4/1969 | Church | 137/636.2 |
| 3,926,220 | 12/1975 | Mahrer | 137/636.2 X |
| 3,938,546 | 2/1976 | Farrell | 137/454.2 |
| 3,952,764 | 4/1976 | Keller | 137/636.1 X |

FOREIGN PATENT DOCUMENTS 160,546  3/1921  United Kingdom ............. 137/329.4

Primary Examiner—Martin P. Schwadron
Assistant Examiner—Richard Gerard
Attorney, Agent, or Firm—St. Onge, Mayers, Steward & Reens

[57] ABSTRACT

A single-lever mixing valve having a removable valve-assembly cartridge with means carried by the cartridge for controlling the valves and an operating handle mounted on the outer casing of the fixture for controlling both the volume of flow and mixing ratio.

6 Claims, 10 Drawing Figures

U.S. Patent  April 18, 1978  Sheet 1 of 3  4,084,611
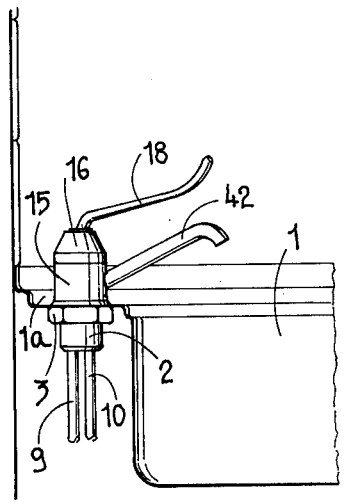
FIG. 1
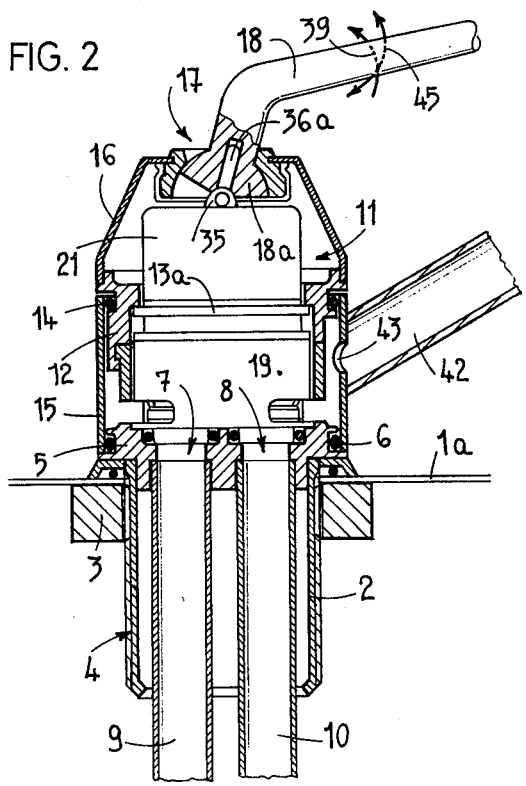
FIG. 2
FIG. 3
FIG. 4

SINGLE-HANDLE MIXING VALVE

The present invention relates to a mixing apparatus for two fluids of different temperatures, and it relates more particularly to a single-lever faucet for adjusting the volume and temperature of the mixed fluid.

The invention resides broadly in providing a mixing valve with a valve-assembly cartridge that is removably mounted as a unit within the outer casing of the fixture with controlmeans carried by the cartridge for operating the valve elements within the cartridge and an operating handle independently mounted on the outer casing but interconnected with the valve controlmeans for actuation thereof when the operating handle is manipulated.

The drawing shows, by way of example, one embodiment of the invention and two modifications.

FIG. 1 is an elevational view of one form of a single-lever faucet embodying the invention mounted on a scullery sink.

FIG. 2 is an axial sectional view thereof at a larger scale.

FIG. 3 is an axial sectional view of the valve assembly cartridge shown in FIG. 2, but on a still larger scale.

FIG. 4 is a perspective view of the valve-control means shown in FIG. 3.

Figures 5, 6:
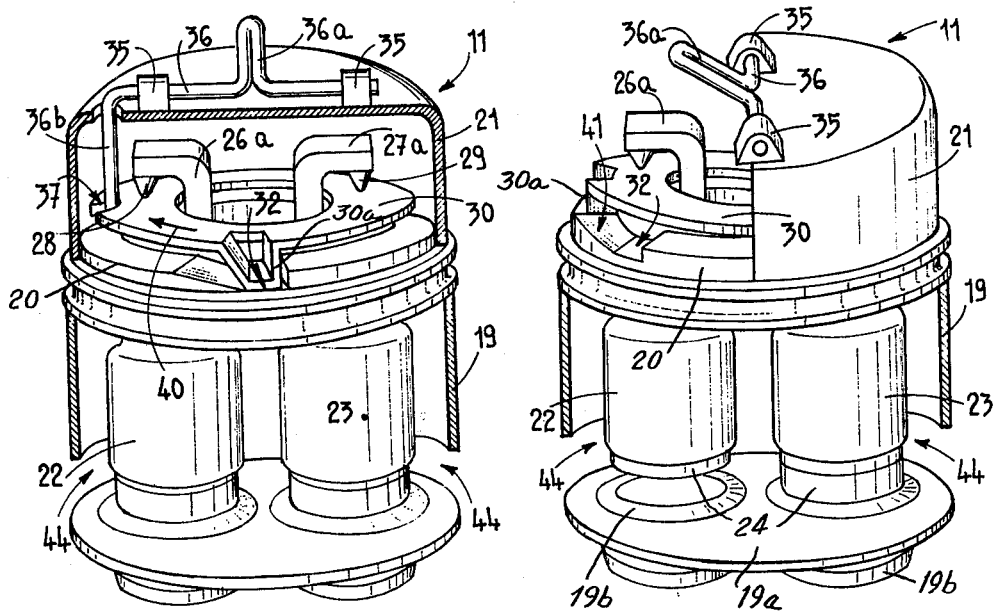
FIGS. 5 and 6 are perspective views from two different angles and with portions broken away of the cartridge shown in, and substantially on the scale of, FIG. 3 with the valve elements and control means disposed in two different operating positions.

The apparatus represented in FIGS. 1 to 6 comprises a frame intended to be secured to a support, for instance to a scullery sink 1. This frame comprises a tubular member 2 engaging an opening of the edge 1a of the sink 1, on which it is maintained by a nut 3 screwed on a thread 4 of the said member 2. This tubular member 2 carries, permanently secured thereon, a circular base 5 provided, outwardly, with an annular groove in which is located an annular sealing gasket 6. Base 5 is provided with two openings 7 and 8 and receives, secured thereon adjacent each of the said openings, respectively, two pipes 9 and 10 which admit hot and cold water, respectively.

The apparatus comprises moreover a cartridge, generally designated by 11, represented in detail in FIGS. 3 and 4, placed on the base 5 and which is maintained in place thereon by a ring 12 bearing on an annular shoulder 13a of the frame, designated by 13, of the said cartridge. Ring 12 is removably secured to base 5 by any suitable means such as a bayonet joint in order to hold the cartridge 11 in its assembled position, and is also provided with an outer annular groove in which is located an annular sealing gasket 14. A tubular sleeve 15, which forms part of an outer casing for the fixture, is supported between the ring 12 and base 5 and is sealed against leakage at its upper end with ring 12 by gasket 14 and at its lower end with base 5 by gasket 6. A cap 16 which forms another part of the outer casing, is removably secured to the ring 12 and carries, mounted thereon by means of a ball and socket joint 17, an operating lever 18 for adjusting the flow of the mixed water produced by the apparatus and for changing the temperature thereof.

The cartridge 11, represented in detail in FIGS. 3, 5 and 6, comprises the hereabove mentioned frame 13, having the shape of a disc, on the lower portion of which is mounted an element of a housing 19 and which carries, at its upper portion, a ring 20 rotatably mounted thereon. This ring carries a cover 21 constituting, with the element 19, the housing of cartridge 11. This housing contains two valve bodies 22 and 23 partially engaged in recesses in the underside of frame 13. The bottom 19a of housing 19 is provided with valve-seat inserts 19b, which extend through the bottom 19a into sealing engagement with openings 7 and 8 in base 5.

Each valve body 22 and 23 contains a valve element 24, of which only one (i.e. that of valve 22) is visible in FIG. 3. Each valve element 24 is urged into closing engagement with its valve seat in the corresponding insert 19b by a coil spring 25 and is rigidly mounted at the lower end of a longitudinally movable rod 26 or 27, the upper end of which has a bent arm 26a and 27a, respectively, that bears on an annular operating member 30. The annular operating member 30, represented in detail in FIG. 4, bears on the one hand on two embossments 31 carried by the ring 20 which is rotatably mounted on the frame 13 of the cartridge, and on the other hand, by means of a protrusion 30a, directly on the said ring 20 which is provided with a notch 32 in which the protrusion 30a is engaged when the apparatus is in its rest position.

The cover 21 carries two brackets 35 serving as an articulation for a lever constituted by a bent portion 36a of a wire 36 (FIGS. 5 and 6) the end 36b of which is bent at right angles for engagement in a notch 37 of the ring 30. The lever 36a is engaged in a recess provided in the lower portion, designated by 18a (FIG. 2), of the lever 18, this recess, when viewed at right angles to FIG. 2, having a rectangular shape corresponding to the shape of the lever 36a.

By lifting the lever 18 in the direction of the arrow 39 of FIG. 2, one rotates the lever 36a on the cover 21, thereby producing the rotation of the ring 30 in the sense of the arrow 40 (FIG. 5) from the position represented in this figure, during which movement the protrusion 30a of member 30 follows as inclined plane 41 forming one side of the notch 32 of the ring 20. There results that the operating member 30, which was initially horizontal, when the apparatus was at rest, becomes progressively inclined, until it occupies its position of maximum inclination when the protrusion 30a leaves the inclined plane 41. If this operation of the lever 18 is effected when it occupies its medium position, in which it is situated in the vertical plane passing through the spout of the apparatus, designated by 42 (FIG. 1 and 2), the ring 20 occupies then a position in which the vertical plane passing through its two embossments 31 is parallel to the vertical plane passing through the axis of the two valves. There results that the plane of symmetry of the operating member 30, which is inclined, is perpendicular to these two vertical planes, and that, consequently, the effect produced by the inclination of member 30 on the two valves, by the intermediary of the followers 28 and 29, is the same for each of them, so that both valves open an equal amount.

Thus, displacement of the operating lever 18 in a vertical plane produces a change in the volume of mixed water that flows through spout 42. As shown in FIG. 2, spout 42 communicates with the inside of the cylindrical sleeve 15 by means of an opening 43 in this sleeve. The water passing through the valves is mixed inside the element 19 of the housing and discharged into the space constituted by the base 5, the sleeve 15 and the ring 12, through openings 44 (FIGS. 3, 5 and 6) of the element 19 of the housing.

When a lateral movement is imparted to the operating lever 18, in the direction of the arrow 45 of FIG. 2, cover 21 is rotated, thereby rotating ring 20 and resulting in the vertical plane passing through the two embossments 31 of this ring being no longer parallel to the vertical plane passing through the axes of the two valves. Consequently the action of the inclination of the operating member on the two valves is not the same for each of them. Thus, depending on how much, and in which direction, the lever 18 is moved laterally, one of the valves is opened more, and the other closed by a corresponding amount, so that the total volume of flow does not change, only the ratio of the amount of hot water and of cold water.

The present arrangement has the advantage that all the means for adjusting the total volume of water, as well as the temperature, are contained in an independent cartridge, which also carries the operating means (i.e. the lever 36a and the cover 21) which operate the said adjusting means, the cartridge being intended to be sold as a separate assembly and, in case of deterioration, to be replaced as a whole. The low manufacturing cost of the valve-assembly cartridge makes complete replacement practical. This cartridge contains all the elements necessary to the operation of the apparatus so that it can be checked, once mounted, without the need of associating it with the outer elements of the apparatus. These other elements can have several shapes and appearances, according to the special uses (kitchens, bath rooms, etc.) of the apparatus, the cartridge being, on the contrary, a standard one.

Figure 7:
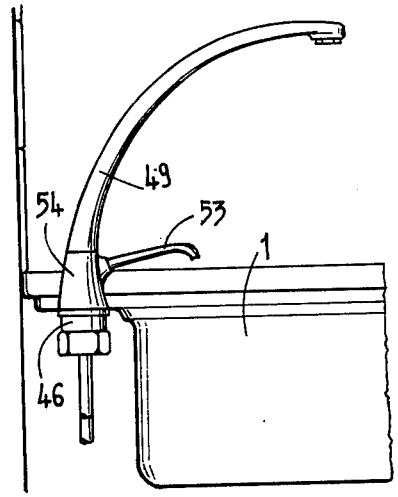
FIG. 7 is an elevational view of another form of single-lever faucet embodying the invention mounted on a scullery sink.
Figure 8:
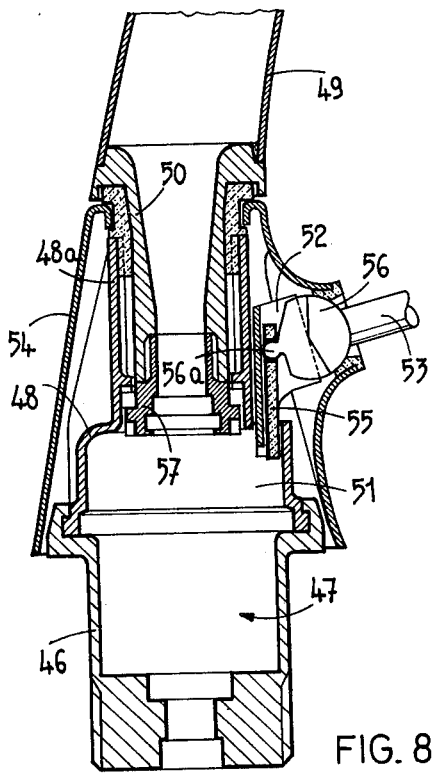
FIG. 8 is an axial sectional view of the faucet shown in FIG. 7 but on a larger scale.

In the modification of FIG. 7 and 8, the frame of the apparatus comprises a socle 46 secured to a sink 1 as in FIG. 1, in which is received a valve-cartridge 47 similar to the cartridge 11 of the first embodiment. A cover 48 is secured by means of a bayonet joint to the socle 46 and maintains the cartridge 47 in place. The spout, designated by 49, is rigid with a tubular member 50 engaged in a trumpet 48a of the said cover. The cover of the housing of the cartridge, designated by 51, is rotatable, as the cover 21 of the cartridge 11 of the first embodiment, and is rigid with a stirrup-shaped member 52. An operating lever 53, carried by a conical sleeve 54 rotatably mounted on the trumpet 48a, allows the stirrup-shaped member 52 to move laterally, thereby rotating the cover 51. This latter carries an operating lever (not shown) which is similar to the lever 36a of FIGS. 2 and 3 and is operated by an operating bar 55. This bar 55 is itself operated by the protrusion 56a of a ball 56 rigid with the lever 53. Thus, as in the first embodiment, by moving the lever 53 upwards and downwards, the volume of flow is changed and, by moving it laterally the ratio of hot to cold water is varied, thereby changing the temperature of the mixed water which flows through the spout 49.

As shown in FIG. 8, the mixed water enters into the spout 49, while passing through the tubular member 50, after having traversed a sleeve 57, which is located above the cartridge 47, and after having gone out of the cartridge by the center of this latter.

Figure 9:
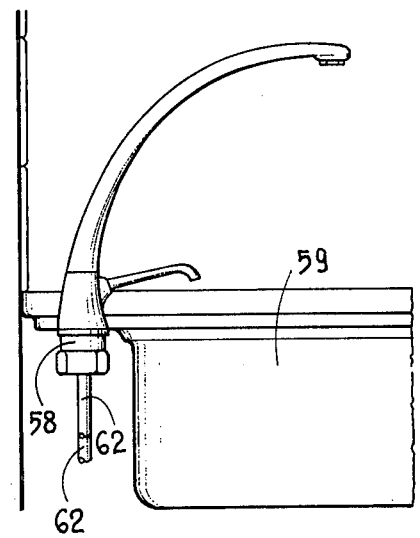
FIG. 9 is an elevational view of a third form of single-lever faucet embodying the invention mounted on a scullery sink.
Figure 10:
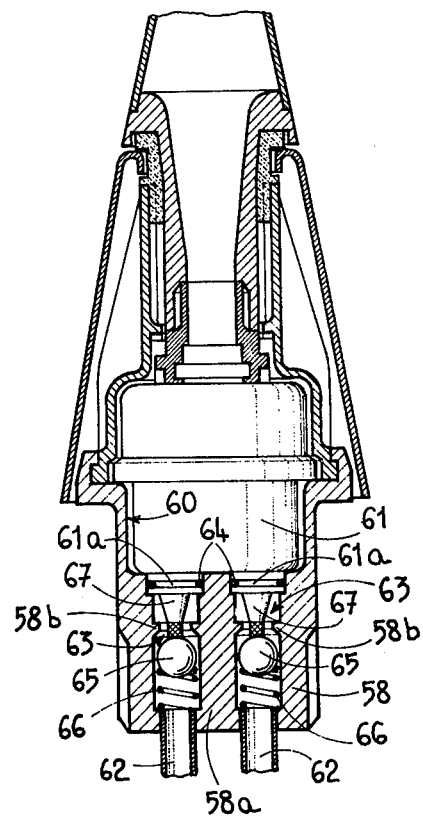
FIG. 10 is a partial sectional view on a larger scale of the embodiment of the invention shown in FIG. 9.

The apparatus represented in FIGS. 9 and 10 comprises a frame constituted by a body 58 secured to a support, for instance a scullery sink 59, and has an inner chamber 60 in which is engaged a cartridge 61 containing the mixing device of the hot and cold waters which are brought by two tubes 62 opening into two recesses 63 provided in the bottom, designated by 58a, of the body 58. The lower ends of two inlet fittings 61a extending from the bottom of cartridge 61 define passages for hot and cold water and are received within recesses 63 of the body 58. Sealing gaskets 64 prevent leakage of the connection between fittings 61a and the body 58.

The details of this arrangement, especially these of the mixing device located in the cartridge, have not been disclosed and represented, being explained in detail in the first embodiment.

The recesses 63 each contain a shut-off valve constituted by ball 65, submitted to the action of a coil spring 66, and which is pressed against a seat constituted by an annular inner shoulder 58b of the wall of each of the recesses 63. Each ball 65 is accompanied by a frusto-conical member 67 interposed between the ball and the corresponding fitting 61a of the cartridge 61. The frusto-concial members 67 can be made of wire netting so as to constitute filters accessible from above. When the cartridge is in place in the body 58, the two members 67 are pressed by the fittings 61a against the ball 65 and move these ones against the action of their return springs 66, thus opening the valves.

There results from this arrangement that so long as the cartridge 61 is not in place in the body 58, neither the hot or cold water can flow, the valves being closed. If, on the contrary, the cartridge is in place in the body 58, it opens automatically the valves, thus giving passage to the two waters.

This arrangement facilitates the maintenance since any failure in the operation of the apparatus, which practically can occur only in the cartridge, can be repaired rapidly by a mere exchange of the defective cartridge against a new one, without being necessary to cut the input of one or the other of the two fluids.

What I claim is:

1. A mixing valve comprising
a base with first and second fluid passages,
an outer casing mounted on said base and having a discharge opening for the mixed fluid,
a valve-assembly cartridge removably mounted as a unit within said casing, said valve-assembly cartridge containing first and second valve elements disposed for communication with said first and second fluid passages, respectively, in said base for producing adjustments in the total volume of flow of said fluids from said passages and in the ratio of the volume of flow of one of said fluids to that of the other, said valve-assembly cartridge having an outlet passage communicating with said discharge opening in said casing,
control-means carried by said valve-assembly cartridge for operating said valve elements,
an operating handle independently mounted on said outer casing by means of an articulated coupling formed in part by an inner facing surface of said outer casing such that the forces due to manipulation of said operating handle are substantially exerted on said outer casing, and means for removably interconnecting said operating handle and control-means for actuation of said control-means upon manipulation of said operating handle.

2. A mixing valve as defined in claim 1, wherein said valve-assembly cartridge includes a housing element, and said interconnecting means comprises a cover member rotatably mounted on said housing element about a first axis, said operating handle being articulated on said outer casing for rotation about said axis and removably connected to said cover member for rotating the same, said cover member being connected to said control-means such that rotation of said cover member by said operating handle effects one of said adjustments.

3. A mixing valve as defined in claim 2, wherein said control-means includes a ring member rigid with said cover member for rotation therewith, said ring member being adapted and arranged on being rotated to adjust the ratio of the volume of flow of one fluid to that of the other.

4. A mixing valve as defined in claim 3, wherein said operating handle is mounted for rotation about a second axis disposed transversely of said first axis, said interconnecting means further including a lever interposed between said operating handle and said control-means such that articulation of said operating handle about said second axis adjusts the total volume of flow of said fluids.

5. A mixing valve as defined in claim 2, wherein said operating handle is mounted for rotation about a second axis disposed transversely of said first axis, said interconnecting means further including a lever interposed between said operating handle and said control means such that articulation of said operating handle about said second axis effects the other of said adjustments.

6. A mixing valve as defined in claim 5, wherein said control-means includes an operating member for adjusting the total volume of flow of said fluids upon articulation of said operating handle about said second axis.

* * * * *